(12) United States Patent
Grünbauer et al.

(10) Patent No.: US 6,211,285 B1
(45) Date of Patent: Apr. 3, 2001

(54) POLYISOCYANATE-BASED POLYMER COMPRISING METAL SALTS AND PREPARATION OF METAL POWDERS THEREFROM

(75) Inventors: Henri J. M. Grünbauer, Oostburg; Jacobus A. F. Broos, Terneuzen, both of (NL); Kevin Pickin, Banbury (GB)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/214,883

(22) PCT Filed: Jul. 21, 1997

(86) PCT No.: PCT/GB97/01956

§ 371 Date: Jul. 30, 1999

§ 102(e) Date: Jul. 30, 1999

(87) PCT Pub. No.: WO98/03569

PCT Pub. Date: Jan. 29, 1998

(30) Foreign Application Priority Data

Jul. 22, 1996 (GB) .................................. 9615373

(51) Int. Cl.$^7$ ...................................... C08K 3/10
(52) U.S. Cl. .................. 524/591; 524/839; 524/840; 524/79; 524/403; 524/405; 524/406; 524/407; 524/408; 524/409; 524/413; 524/434; 524/435; 524/436; 524/437; 75/362
(58) Field of Search .................. 524/591, 839, 524/840; 528/55, 56, 57, 58; 75/362

(56) References Cited

U.S. PATENT DOCUMENTS

| | | | |
|---|---|---|---|
| 3,325,698 | 6/1967 | Mooneyhan | 317/230 |
| 3,510,323 | 5/1970 | Wismer et al. | 106/41 |
| 3,540,884 | 11/1970 | Horbury | 75/211 |
| 3,658,563 | 4/1972 | Washio et al. | 501/102 |
| 4,367,259 | 1/1983 | Fulmer et al. | 428/240 |
| 4,442,175 | 4/1984 | Flannery et al. | 428/204 |
| 4,569,821 | 2/1986 | Duperray et al. | 419/2 |
| 4,778,671 | 10/1988 | Wusirika | 423/592 |
| 4,917,857 | 4/1990 | Jaeckel et al. | 419/9 |
| 4,929,433 | 5/1990 | Hexemer, Jr. et al. | 423/411 |
| 5,102,836 | 4/1992 | Brown et al. | 501/104 |
| 5,188,780 | 2/1993 | Lange et al. | 264/63 |
| 5,202,306 | 4/1993 | Goretta et al. | 501/152 |
| 5,338,334 | 8/1994 | Zhen et al. | 75/362 |
| 5,597,649 * | 1/1997 | Sandor et al. | 428/370 |
| 5,698,483 | 12/1997 | Ong et al. | 524/403 |

FOREIGN PATENT DOCUMENTS

| | | |
|---|---|---|
| 834933 | 12/1965 | (CA) . |
| 0 087 160 | 2/1983 | (EP) . |
| 0 395 243 | 10/1990 | (EP) . |
| 0 422 105 B1 | 4/1991 | (EP) . |
| 0 522 133 A1 | 1/1993 | (EP) . |
| 0 621 234 A1 | 10/1993 | (EP) . |
| 0 621 234 B1 | 10/1994 | (EP) . |
| 62-252383 | 4/1968 | (JP) . |
| 59-83972 | 5/1984 | (JP) . |
| 60-215586 | 10/1985 | (JP) . |
| 60-239376 | 11/1985 | (JP) . |
| 61-21960 | 1/1986 | (JP) . |
| 62-158173 | 7/1987 | (JP) . |
| 3-252304 | 3/1990 | (JP) . |
| 3-124404 | 5/1991 | (JP) . |
| 7097566 | 4/1995 | (JP) . |
| 96/29280 | 9/1996 | (WO) . |
| 98/03569 | 1/1998 | (WO) . |

* cited by examiner

*Primary Examiner*—James J. Seidleck
*Assistant Examiner*—Melanie D. Bagwell

(57) ABSTRACT

A polyisocyanate-based polymer having dispersed therein a metal salt, obtained by reacting an organic polyisocyanate with an aqueous composition of a metal salt. The polymer comprises the metal salt in an amount of from at least 10 weight percent based on total weight of the dry salt with the weight of the polyisocyanate-based polymer including salt therein. The polymer on calcination provides a metal-containing powder having an average particle size of 1 micrometer or less. Such metal-containing powders are of value in the preparation of industrial catalysts, ceramics, electronic components, or as fillers in plastics, paints, or cosmetics.

16 Claims, No Drawings ized in that the polymer comprises the metal salt in an
POLYISOCYANATE-BASED POLYMER COMPRISING METAL SALTS AND PREPARATION OF METAL POWDERS THEREFROM This invention relates to a polyisocyanate-based polymer containing a metal salt, a process for the preparation of the polymer, and a process for calcining the obtained polymer to provide a powder substance containing the metal, with said powder having an average particle size of less than 1 micrometer.

BACKGROUND OF THE INVENTION

Metal or metal oxide particles of submicron size are a valuable industrial commodity finding use in many applications including for example in the manufacture of industrial catalyst such as might be employed in the chemical industry, in the manufacture of ceramics, of electronic components, and as fillers for, for example, plastics, paints or cosmetics.

A large variety of techniques are available for the manufacture of metal or metal oxide powders having a very fine particle size. Such techniques include solution processes and high temperature gas phase and condensed phase syntheses. For a comprehensive review of the general techniques available reference is made to the recent publication entitled "Chemical Engineering Aspects of Advanced Ceramic Materials" by V. Hlavacek and J. A. Puszynski published in the Journal of Industrial Engineering and Chemical Research, pages 349–377, Volume 35, 1996.

Despite the numerous procedures available a problem in common to a lesser or greater extent with nearly all methods is the difficulty of obtaining consistently fine uniform particles of good purity and strength. Procedures that can provide a greater consistency in this respect invariably have high costs associated with their operation due to the complexity of the equipment required, the use of expensive raw materials, or high energy consumption. It would therefore be desirable to develop a cost effective procedure leading to the production of metal or metal oxide powders having a consistently fine particle size. It would be of particular advantage if such a procedure could be operated using raw materials readily available and could be operated in the substantial absence of highly specialized equipment and costly solvents or chemical processing aids. It would also be an advantage if such a procedure were able to provide for the production of metal powders in a more attractive yield.

A common objective is the production of a metal powder that has a fine particle size and does not exhibit the problem of agglomeration leading to a wide particle size distribution. To optimize this, it is necessary to develop a process which provides a homogeneous and even distribution, precipitation, of the metal-containing substance in the first instance without providing subsequent opportunity for secondary nucleation leading to agglomeration. With this in mind, laboratory studies have been undertaken to evaluate the use of reactive polymer chemistry in providing the desired homogeneous distribution starting from an aqueous metal salt solution. The reactive polymer of choice is polyurethane; the basic polyurethane reactive components comprising polyisocyanate are commercially available at low cost and exhibit compatibility with water. Patent publications which disclose the manufacture of polyurethane polymer containing metal particles or metal salts and the subsequent calcining or pyrolysis of the resulting polymer include U.S. Pat. Nos. 3,510,323; 4,569,821; and 5,338,334; and the published French Patent application 2,609,915. These documents do not meet the particular needs outlined above.

SUMMARY OF THE INVENTION

In a first aspect, this invention relates to a polyisocyanate-based polymer having dispersed therein a metal salt, said polymer being obtained by reacting an organic polyisocyanate with an aqueous composition of a metal salt, characterized in that the polymer comprises the metal salt in an amount of from at least 10 weight percent based on total dry weight of the salt and the polyisocyanate-based polymer.

In a second aspect, this invention relates to a process for preparing a polyisocyanate-based polymer having dispersed therein a metal salt by reacting an organic polyisocyanate with an aqueous composition of a metal salt characterized in that:

i) the amount of metal salt employed is sufficient to provide the resulting polymer with a metal salt content of at least 10 weight percent based on total dry weight of the salt and the polyisocyanate-based polymer; and in that ii) the polyisocyanate is present in an amount of from at least 10 parts by weight per 100 parts by weight of the aqueous composition with the proviso that when the aqueous composition comprises an additional isocyanate-reactive substance in an amount of more than about 60 weight percent, the amount of polyisocyanate employed does not exceed more than about 70 parts by weight.

In a third aspect, this invention relates to a process for producing a metal-containing powder having an average particle size of less than 1 micrometer, which process comprises calcining a polyisocyanate-based polymer having dispersed therein a metal salt, at a temperature of from about 300° C. to about 1500° C. characterized in that the polymer has a metal salt content at least 10 weight percent based on total dry weight of the salt and the polyisocyanate-based polymer.

In a fourth aspect, this invention relates to a metal-containing powder obtainable by calcination of a polyisocyanate-based polymer having dispersed therein a metal salt characterized in that the powder has an average particle size of less than about 1 micrometer and an average BET surface area of more than 200 m$^2$/gram.

In yet a fifth aspect, this invention relates to a composition containing a metal-containing powder obtainable such a calcination process characterized in that the composition comprises a bulk phase having dispersed therein from about 0.1 to about 50 weight percent of the powder based on total weight of the bulk phase and powder.

The present invention provides for a relatively simple and cost-effective route for the manufacture of metal-containing powders of submicron particles size. Such particles find value in the manufacture of ceramic articles, electronics, industrial catalysts and as fillers in plastics, paints or cosmetics including creams and oils. When used as filler, the smaller particle of the filler provide for a minimum reflection of visible light allowing exploitation of filler properties with minimal disturbance to transparency or visible light transmission properties of the substance to be filled. Transmission of electromagnetic radiation of other wavelengths may be blocked by the presence of the filler.

DETAILED DESCRIPTION OF THE INVENTION

Described hereinafter is a polyisocyanate-based polymer having dispersed therein a metal salt; a process for the preparation of such polymer; a process for calcining the obtained polymer to provide a metal-containing powder; and a metal-containing powder having a submicron particle size.

The metal in the "metal-containing" powder may be present as elemental metal, or as an oxide, carbide or alloy thereof. Whether the powder which is obtained will be a metal, a metal alloy, oxide or carbide will depend upon the metal salt(s) present in the polyisocyanate-based polymer and the conditions of pyrolysis or calcining. It is also to be appreciated that the same factors can influence the characteristics of the particles including their size and surface area.

The metal-containing powder obtained according to this invention is characterized in that it has an average particle size of less than 1 micrometer (1000 nanometers), preferably less than about 0.1 micrometer (100 nanometers), and more preferably less than 0.02 micrometer (20 nanometers). By the term average particle size it is understood that less than about 25, preferably less than about 10, and more preferably less than about 5 percent of the metal particles will have a size in excess of the mentioned particle size. By the term "particle size" it is meant the size of the particle in its largest dimension. The powder is further characterized in that it has an average BET surface area of at least 5, preferably at least 25, more preferably at least 100, and yet more preferably of at least 200 $m^2$/gram. In a preferred embodiment the metal-containing powder has an average particle size of less than about 0.1 micrometer and an average BET surface area of at least 25 $m^2$/gram.

The powder obtainable according to this invention can comprise any desired metal. Advantageously the metal, in a zero or appropriate oxidation state, is one or more of the elements lanthanum, barium, strontium, chromium, zirconium, yttrium, aluminum, lithium, iron, antimony, bismuth, lead, calcium, magnesium, copper, boron, cadmium, cesium, dysprosium, erbium, europium, gold, hafnium, holmium, lutetium, mercury, molybdenum, niobium, osmium, palladium, platinum, praseodymium, rhenium, rhodium, rubidium, ruthenium, samarium, scandium, sodium, tantalum, ytterbium, thorium, thulium, tin, zinc, nickel, titanium, tungsten, uranium, vanadium, or ytterbium.

The powder is obtained by the pyrolysis and/or calcining of a particular polyisocyanate-based polymer having dispersed therein a metal salt obtained by reacting an organic polyisocyanate with an aqueous composition of a water soluble metal salt. The metal salt content of the polymer should be as high as practically possible to provide for attractive yields of any subsequent metal powder. For this reason, the polymer has a metal salt content of at least 10, preferably from 12 to 50, and more preferably from 15 to 30 weight percent based on the based on total dry weight of the salt and the polyisocyanate-based polymer. By the term "dry weight" it is meant the weight of the metal salt excluding any water of crystallization as might be present. For the purpose of obtaining an attractive yield of metal-containing powder, advantageously the polyisocyanate-based polymer has an overall density of greater than 400 kg/m3, preferably from about 420 to about 1200 kg/m3, yet more preferably from about 500 to about 1000 kg/m3. While it is possible to prepare polymer of a lower density, such lower density polymer occupies a larger volume and does not provide for a subsequent cost effective production of the metal-containing powder.

The organic polyisocyanate used to prepare the polymer can be any organic aliphatic or aromatic polyisocyanate commonly used when preparing polyurethane polymers and foams. Representative of these types are diisocyanates such as m- or p-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanace (and isomers), naphthalene-1,5-diisocyanate, 1-methylphenyl-2,4-phenyl diisocyanate, diphenylmethane-4,4'-diisocyanate, diphenylmethane-2,4'-diisocyanate, 4,4'-biphenylene diisocyanate, 3,3'-dimethoxy-4,4'-biphenylene diisocyanate and 3,3'-dimethyldiphenylpropane-4,4'-diisocyanate; triisocyanates such as toluene-2,4,6-triisocyanate and polyisocyanates such as 4,4'-dimethyldiphenylmethane-2,2',5'5'-tetraisocyanate and the diverse polymethylene polyphenyl polyisocyanates. A crude polyisocyanate may also be used such as the crude toluene diisocyanate obtained by the phosgenation of a mixture of toluene diamines, or the crude diphenylmethane diisocyanate obtained by the phosgenation of crude diphenylmethanediamine. The preferred undistilled or crude polyisocyanates are disclosed in U.S. Pat. No. 3,215,652. Especially preferred are the polymethylene polyphenyl polyisocyanates, having an average functionality of from 2.05 to 3.5, preferably from 2.4 to 3.1 isocyanate moieties per molecule, due to their ability to cross-link the polyurethane.

The aqueous composition comprises one or more metal cations in association with one or more anions, or a mixture of metal cations and anions with a metal oxide. To provide for compatibility with the process of forming the polyisocyanate-based polymer and for the subsequent calcining process it is of advantage to have as the anion a halide, carbonate, bicarbonate, hydroxide, mercaptide, alkoxide, carboxylate, oxalate, sulphate, bisulphite or nitrate. Preferred anions include chloride, carbonate, hydroxide, alkoxide, carboxylate or nitrate. For reason of good solubility in water, metal salts having as the anion component a nitrate are preferred. The metal cation can in principle be of any metal from which it is desired to obtain a metal powder, however those presently having known industrial value and suitable for use in the present invention include lanthanum, barium, strontium, chromium, zirconium, yttrium, aluminum, lithium, iron, antimony, bismuth, lead, calcium, magnesium, copper, boron, cadmium, cesium, dysprosium, erbium, europium, gold, hafnium,, holmium, lutetium, mercury, molybdenum, niobium, osmium, palladium, platinum, praseodymium, rhenium, rhodium, rubidium, ruthenium, samarium, scandium, sodium, tantalum, ytterbium, thorium, thulium, tin, zinc, nickel, titanium, tungsten, uranium, vanadium, or ytterbium, or a mixture of two or more thereof. The concentration of metal salt present in the aqueous composition advantageously is as high as practically possible in consideration of its solubility limit and the constraints of the polymer formation process. Where possible it is preferred to use aqueous compositions which are essentially saturated solutions at ambient temperature.

Optionally, but advantageously, the aqueous composition further contains an additional isocyanate-reactive substance. When the aqueous composition comprises both metal salt and additional isocyanate-reactive substance, the amount of additional isocyanate-reactive substance advantageously does not exceed about 90, preferably does not exceed about 60, and more preferably does not exceed about 40 weight percent based on total parts by weight of the aqueous composition. The additional isocyanate-reactive substance can be any isocyanate-reactive substance, excluding water. Such substances are referred to collectively herein as "polyahls". The term "polyahl" is used to describe any isocyanate-reactive substance containing two or more isocyanate reactive moieties per molecule. Such reactive moieties include hydroxyl, primary or secondary amine, carboxylic acid, or thiol groups. Polyols, e.g., compounds having at least two hydroxyl groups per molecule, are especially preferred due to their desirable reactivity with polyisocyanates.

Typically polyahls suitable for preparing rigid polyurethane include those having an equivalent weight of from about 50 to about 700, preferably from about 70 to about 300 and more preferably from about 70 to about 150. Such polyahls also advantageously have a functionality of at least 2, preferably about 3, and up to about 16, preferably up to about 8, active hydrogen atoms per molecule. Representative of polyahls include polyether polyols, polyester polyols, polyhydroxy-terminated acetal resins, hydroxyl-terminated amines and polyamines.

Examples of these and other suitable isocyanate-reactive materials are described more fully in U.S. Pat. No. 4,394,491, particularly in columns 3 to 5. Preferred for preparing rigid foams, on the basis of performance, availability and cost, is a polyol prepared by adding an alkylene oxide to an initiator having from about 2 to about 8, preferably about 3 to about 8 active hydrogen atoms. Examples of such polyols include those commercially available under the trademark designation VORANOL including VORANOL 202, VORANOL 360, VORANOL 370, VORANOL 446, VORANOL 490, VORANOL 575, VORANOL 640 and VORANOL 800, all sold by The Dow Chemical Company, and PLURACOL 824, sold by BASF Wyandotte. Other highly preferred polyols include alkylene oxide derivatives of Mannich condensates, as disclosed, for example, in U.S. Pat. Nos. 3,297,597; 4,137,265 and 4,383,102; and aminoalkylpiperazine-initiated polyethers as described in U.S. Pat. No. 4,704,410 and 4,704,411. Other polyols distinguished from the above by having a hydroxyl equivalent weight of greater than 700, and normally contemplated for use when preparing a flexible polyurethane foam, can also be used in the present invention though rigid polyols are preferred for reasons of optimizing on the eventual yield of the metal powder.

To provide for a homogeneous dispersion of the metal salt within the polymer polyols suited to the preparation of rigid polyurethane are advantageously employed, and especially amine-initiated polyether polyols. Such polyols provide for a greater system reactivity leading to a desirable dispersion of the metal salt in the polymer and further restricting the opportunity for formation of salt crystals within the polymer. It is presently believed that a high system reactivity is required so that the water of the aqueous composition is expediently removed, by its reaction with the isocyanate, leading to a fine dispersion of the salt in the polymer. In contrast it is believed that lower reactivity leads to a slower removal of the water providing an opportunity for growth of metal salt crystals during formation of the polymer. Such crystal formation providing a locally high concentration of metal salt within the polymer which subsequently on calcining may lead to the formation of a particle having a larger particle size.

When preparing the polymer of the invention, the polyisocyanate and aqueous composition are present in relative proportions to provide a polymer with a metal salt content as described above. The amount of polyisocyanate employed is preferably from at least 10, preferably from 10 to 100, and more preferably from about 10 to about 70 parts by weight per 100 parts by weight of aqueous composition, with the proviso that when the aqueous composition comprises an additional isocyanate-reactive substance in an amount of more than 60 weight percent, the amount of polyisocyanate employed does not exceed more than about 70, and preferably do not exceed more than about 60 parts by weight. Higher amounts are not practical if intending to provide for an attractive yield of metal powder from a given weight of polymer.

The purity of a metal-containing powder can be important if to have value in certain applications including those of the electronics industry. Contaminants such as silicon, phosphorus and in some instances tin should be minimized. Accordingly when preparing the polymer of the present invention, as intermediate to the formation of the metal-containing powder, it advantageous for the resulting polymer product and its associated preparation process that there is a substantial absence of silicone-based surfactants, phosphorus-containing substances, or metal-based polyurethane promoting catalysts.

When it is desired to increase the rate of formation of the polymer, a catalyst can be employed. Suitable catalysts include nitrogen-based substances such as those well known a person familiar in the art of manufacturing polyurethane polymer and therefore need not be further described here. In the present invention it is not necessary that the resulting polymer have a good cellular structure, a collapsed and brittle polymer with little or no cellular structure is equally of value for the subsequent calcining procedure. A defoamer agent can therefore advantageously be present when preparing the polyisocyanate-based polymer. Examples of common defoamer agents include non-silicone-based grease and hydrocarbon oils.

Any equipment commonly used in the continuous or discontinuous manufacture of polyurethane foams or elastomers can be employed to produce the polymer of this invention. Such equipment provides for the efficient mixing, under high shear conditions, of controlled amounts of polyisocyanate with the aqueous composition. To assist in the production of polymer of the present invention it is convenient to operate such equipment with a raw material temperature as high, and mixing times as long, as possible. High component temperatures promote a more rapid reaction leading to a desirable conversion of water or alternatively its loss through evaporation. High process temperatures also optimize the solubility of the metal salt in the aqueous composition and minimize any tendency for its crystallizing out as the water is consumed by reaction with the polyisocyanate. Extended mixing times provide for the greatest opportunity for optimum conversion of reactants to polymer.

The polymer containing metal salt dispersed therein when calcined under controlled conditions, providing for the removal of the polyisocyanate-based polymer, results in the formation of a substantially uniformly sized, agglomerate-free, metal-containing powder.

Typically the calcining conditions require exposing the polymer to a temperature of from about 300° C. to about 1500° C., and preferably from about 400° C. to about 1000° C. for a period of a few minutes to many hours. Prior to the thermal treatment of the polymer, if it contains significant amounts of residual aqueous composition or polyisocyanate, it may be of advantage to wash and dry the polymer. Also to assist in removal of the polyisocyanate-based polymer, prior to calcining, optionally a pyrolysis step may be employed.

The described metal-containing powders having a submicron particle size are of value in the manufacture or ceramic articles, industrial catalysts, electronic components, and as fillers for plastics, paints or cosmetics. When used as filler the metal-containing powder will be present, based on total weight of bulk matrix and powder, typically in an amount of from about 0.1 to about 50, and more usually in an amount of from about 1 to about 25 weight percent. The bulk matrix, may be, for example, a plastic including a thermoset or thermoplastic polymer, a paint, or a cosmetic composition cream or oil.

SPECIFIC EMBODIMENTS OF THE INVENTION

The invention is illustrated by way of the following Examples, which are not to be considered as limiting the scope of the invention. Unless otherwise indicated all amounts given are parts by weight.

Example 1

A polyisocyanate-based polymer containing a metal salt is prepared by reacting the following components: as
Aqueous Composition
  26.6 pbw VORANOL 1055
  11.5 Ethanolamine
  61.9 a 36 wt % aqueous solution of aluminum nitrate (dry weight); with as
Polyisocyanate
  26.8 pbw VORANATE M220.
    VORANOL 1055 is a glycerine-propylene oxide adduct with a molecular weight of about 1000 and available from The Dow Chemical Company.
    VORANATE M220 is a crude polymethylene polyphenyl polyisocyanate having an average NCO content of about 31.5 wt %, available from The Dow Chemical Company.

The resulting polymer has an essentially non cellular structure and an overall density in excess of 1000 kg/m3. The metal salt content of the polymer is 23.2 weight percent. The polymer is subjected to a grinding procedure to provide course granules which on subsequent calcination for a period of about 3 hours at 700° C. in an air environment yield a white or colourless powder. The yield of powder containing aluminum is estimated to be about 6.7%. The average BET surface area of the powder is observed to be 250 $m^2$/gram and indicative of an average particle size significantly smaller than one micrometer.

What is claimed is:

1. A polyisocyanate-based polymer having dispersed therein a metal salt, said polymer being obtained by reacting an organic polyisocyanate with an aqueous composition of a metal salt characterized in that the resulting polymer comprises the metal salt in an amount of from 10 to 50 weight percent based on total dry weight of the salt and the polyisocyanate-based polymer; wherein the polymer has an essentially non-cellular structure and an overall density of at least 400 kg/$m^3$.

2. The polymer of claim 1 wherein the metal salt is present in an amount of at least 12 weight percent.

3. The polymer of claim 1 or claim 2 wherein the metal salt comprises at least one metal cation; which includes lanthanum, barium, strontium, chromium, zirconium, yttrium, aluminum, lithium, iron, antimony, bismuth, lead, calcium, magnesium, copper, boron, cadmium, cesium, dysprosium, erbium, europium, gold, hafnium, holmium, lutetium, mercury, molybdenum, niobium, osmium, palladium, platinum, praseodymium, rhenium, rhodium, rubidium, ruthenium, samarium, scandium, sodium, tantalum, ytterbium, thorium, thulium, tin, zinc, nickel, titanium, tungsten, uranium, vanadium, or ytterbium.

4. The polymer of claim 3 wherein the metal salt contains as anion, a chloride, carbonate, hydroxide, alkoxide, carboxylate or nitrate.

5. The polymer of claim 1 further characterized by the substantial absence of a silicone-based surfactant.

6. The polymer of claim 1 further characterized by the substantial absence of a metal-based polyurethane-promoting catalyst.

7. The polymer of claim 1 further characterized by the substantial absence of a phosphorus-containing substance.

8. A process for preparing a polyisocyanate-cased polymer having dispersed therein a metal salt by reacting an organic polyisocyanate with an aqueous composition of a metal salt characterized in that:
  i) the amount of metal salt present in the process is sufficient to provide the resulting polymer with a metal salt content of from 10 to 50 weight percent based on total dry weight of the salt and the polyisocyanate-based polymer;
  ii) the resulting polymer has an overall density of at least 400 kg/$m^3$, and
  iii) the polyisocyanate is employed in an amount of from at least 10 parts by weight per 100 parts by weight of the aqueous composition with the proviso that when the aqueous composition comprises an additional isocyanate-reactive substance in an amount of more than 60 weight percent, the amount of polyisocyanate employed does not exceed 70 parts by weight.

9. The process of claim 8 wherein the aqueous composition further contains an additional isocyanate-reactive component.

10. The process of claim 8 wherein the metal salt comprises at least one metal cation, including lanthanum, barium, strontium, chromium, zirconium, yttrium, aluminum, lithium, iron, antimony, bismuth, lead, calcium, magnesium, copper, boron, cadmium, cesium, dysprosium, erbium, europium, gold, hafnium, holmium, lutetium, mercury, molybdenum, niobium, osmium, palladium, platinum, praseodymium, rhenium, rhodium, rubidium, ruthenium, samarium, scandium, sodium, tantalum, ytterbium, thorium, thulium, tin, zinc, nickel, titanium, tungsten, uranium, vanadium, or ytterbium.

11. The process of claim 10 wherein the metal salt contains as anion a chloride, carbonate, hydroxide, alkoxide, carboxylate or nitrate.

12. The process of claim 8 characterized by the substantial absence of a silicone-based surfactant.

13. The process of claim 8 further characterized by the substantial absence of a metal-based polyurethane-promoting catalyst.

14. The process claim 8 characterized by the substantial absence of a phosphorus-containing substance.

15. A process for producing a metal-containing powder having an average particle size of less than 1 micrometer by calcining at a temperature of from about 300° C. to about 1500° C. a polyisocyanate-based polymer having dispersed therein a metal salt characterized in that the polymer has a metal salt content of from 10 to 50 weight percent based on total dry weight of the salt with the weight of polyisocyanate-based polymer including salt therein, and wherein the polymer has an overall density of at least 400 kg/$m^3$.

16. A composition containing a metal-containing powder obtained according to the process of claim 15 characterized in that the composition comprises a bulk phase having dispersed therein from about 0.1 to about 50 weight percent of the powder based on total weight of the bulk phase and powder.

* * * * *